(No Model.) 5 Sheets—Sheet 1.
W. O. PARTRIDGE.
DUPLEX DESK.
No. 428,407. Patented May 20, 1890.
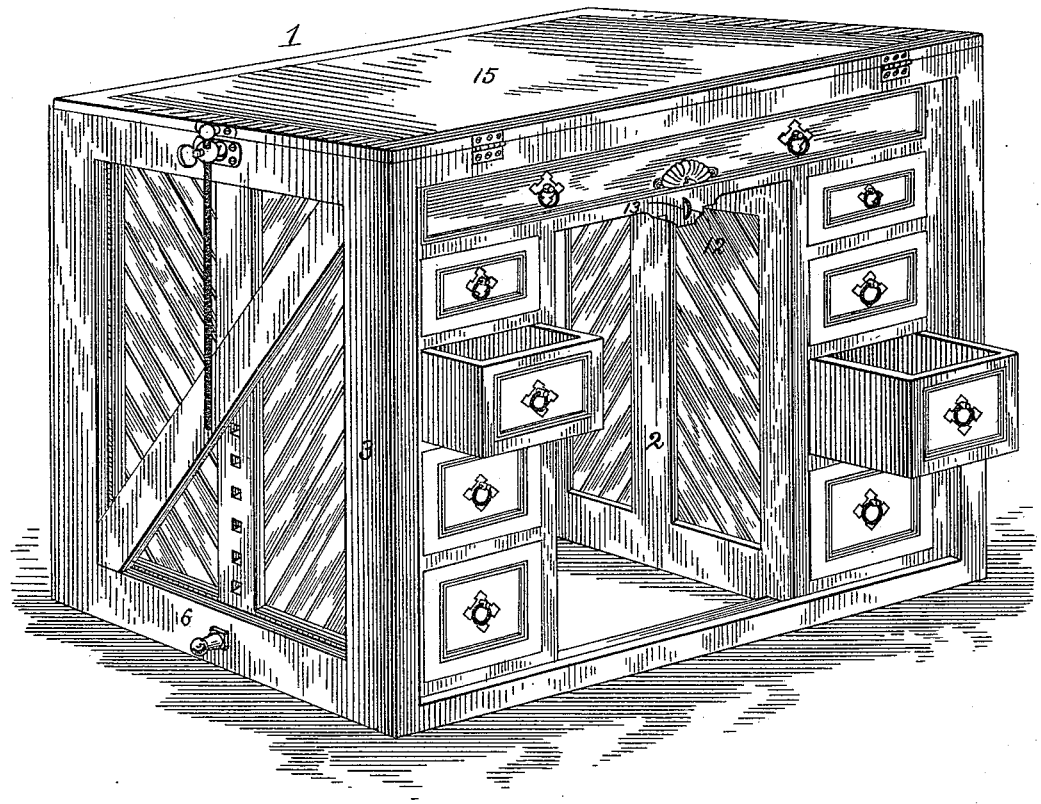
Fig. 1.
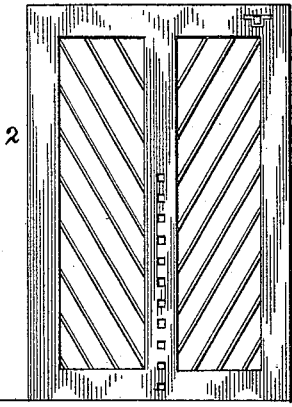
Fig. 3.
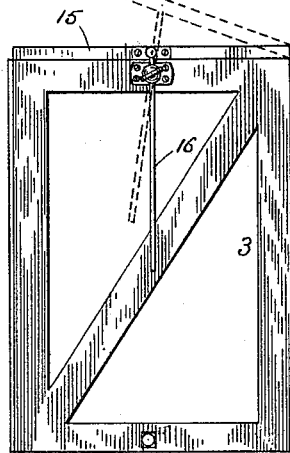
WITNESSES: INVENTOR,
R. Henry Marsh. Wm O. Partridge.
Francis C. Stanwood by H. E. Lodge Atty.

(No Model.) 5 Sheets—Sheet 2.

W. O. PARTRIDGE.
DUPLEX DESK.

No. 428,407. Patented May 20, 1890.

WITNESSES.
Henry Marsh.
Francis C. Stanwood

INVENTOR.
Wm O. Partridge.
by H. E. Lodge Atty

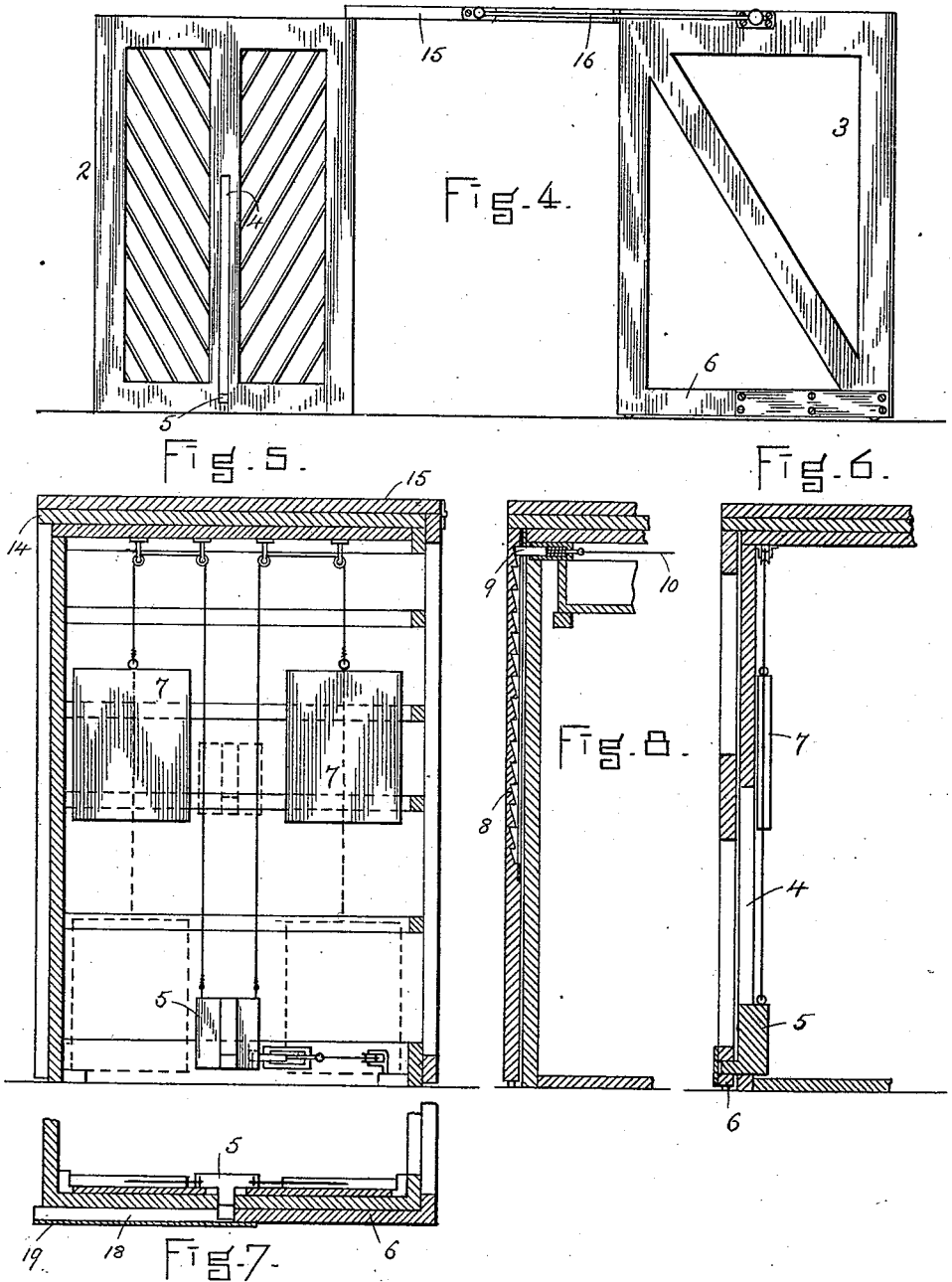

(No Model.)  W. O. PARTRIDGE.  5 Sheets—Sheet 4.
DUPLEX DESK.

No. 428,407.  Patented May 20, 1890.

WITNESSES.  INVENTOR.
R. Henry Marsh.  Wm. O. Partridge.
Francis C. Stanwood.  by H. E. Lodge Atty.

(No Model.)  5 Sheets—Sheet 5.

W. O. PARTRIDGE.
DUPLEX DESK.

No. 428,407.  Patented May 20, 1890.

WITNESSES.
Henry Marsh.
Francis E. Stanwood.

INVENTOR.
Wm O. Partridge.
by H. E. Lodge Atty.

UNITED STATES PATENT OFFICE.

WILLIAM ORDWAY PARTRIDGE, OF MILTON, MASSACHUSETTS.

DUPLEX DESK.

SPECIFICATION forming part of Letters Patent No. 428,407, dated May 20, 1890.

Application filed October 28, 1889. Serial No. 328,487. (No model.)

*To all whom it may concern:*

Be it known that I, WILLIAM ORDWAY PARTRIDGE, a citizen of the United States, residing at Milton, in the county of Norfolk and State of Massachusetts, have invented certain new and useful Improvements in Duplex Desks; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

This invention relates to improvements in furniture, particularly that class termed "desks."

The object of my invention is to make a desk which as an entirety is to all intents and purposes a single article of furniture, but which may be separated to form two desks; hence I have termed the completed article a "duplex desk."

The primary feature consists, in connection with an inner desk proper, of a secondary or outside desk, which is adapted to telescope about the other, and is further enabled to move vertically as well as horizontally with respect to the desk proper. Thereby it can easily be separated and the single desk be converted into two distinct pieces of furniture. Further, it provides the outside desk with a movable cover, which can be set at any angle. Thus either surface can be used exteriorly for writing, drawing, &c. The under side, however, when this cover is thrown back, can be utilized to suspend or rest designs or works of art from which a copy is to be made, using the top of the outer desk beneath said cover as the surface of the desk at such times.

Other features of novelty contained in my invention—such as adjusting the outside desk in any vertical position or the device by which it is held in engagement with or disengaged from the desk proper to form a desk by itself—will be fully hereinafter described.

Figure 2:
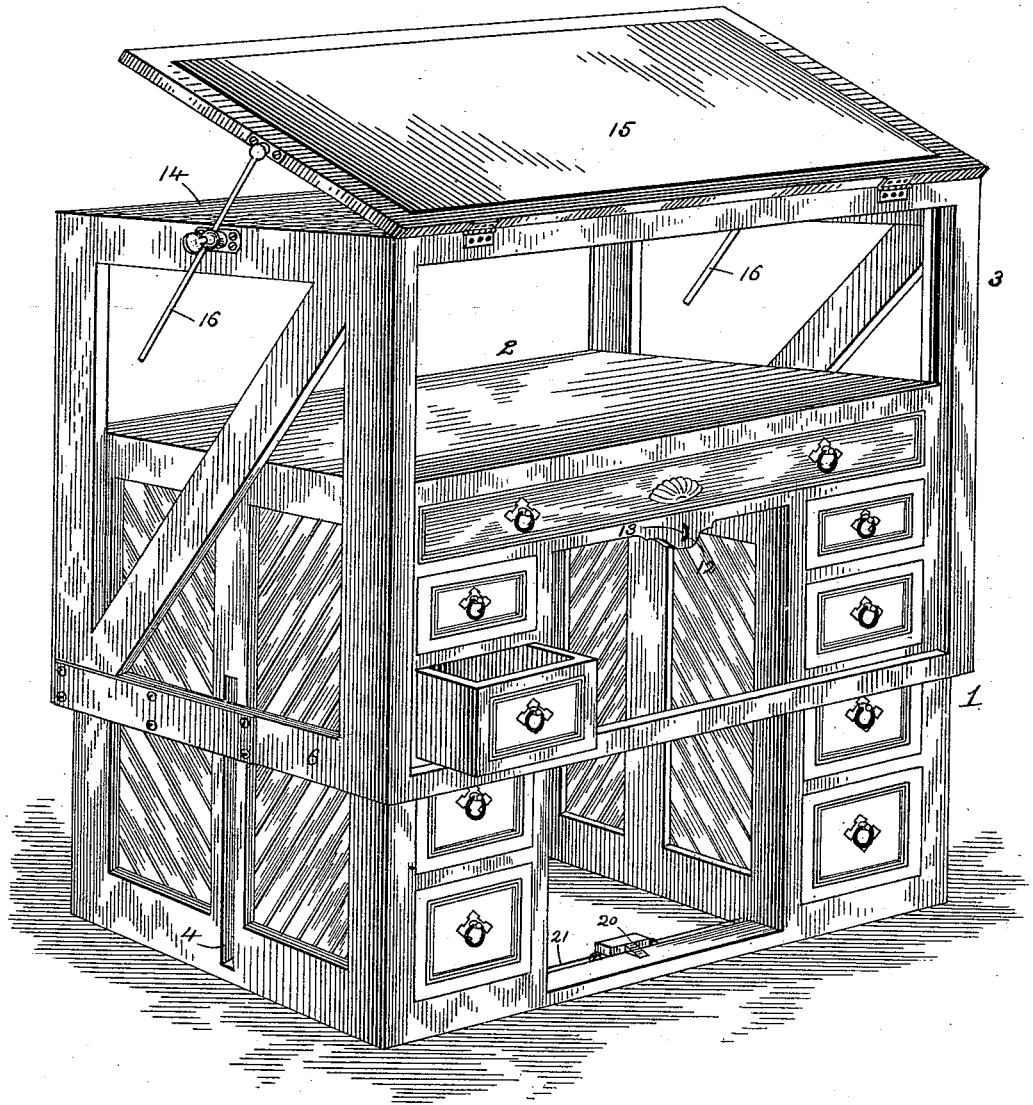
Figure 9:
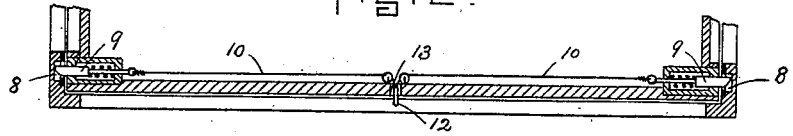
Figure 10:
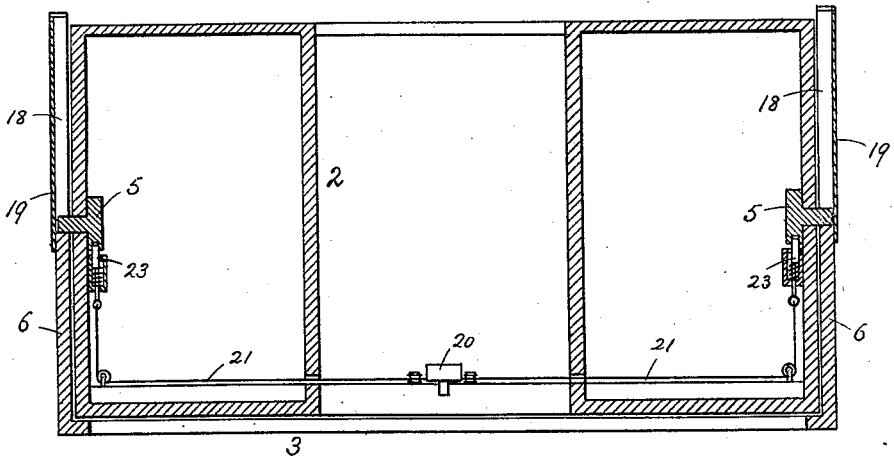
Figure 11:
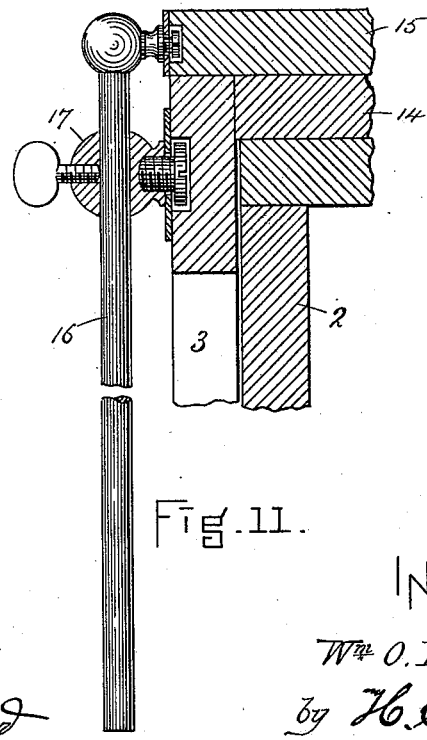

The drawings accompanying this specification represent, in Figure 1, a perspective view of a duplex desk embodying my invention, and Fig. 2 a perspective view of the desk proper as a single piece of furniture with the outer desk raised; Fig. 3, an end elevation of the desk proper with the outer desk rolled off. Fig. 4 is an end elevation of the desk with the outer desk off and with the pivoted top folded back and laid on the desk proper, making a table. Fig. 5 is a vertical section through the desk proper, showing T-piece and weights in elevation. Fig. 6 is a transverse vertical section in part of the same. Fig. 7 is a horizontal section through the desk proper and the outer desk, showing the slot in which the T-shaped piece engages. Fig. 8 is a section through the latching device that holds the outer desk in position when it is not desired as a separate piece of furniture, and also serves as a positive support to the outer desk when it is drawn up. Fig. 9 is a horizontal section in part of the same. Fig. 10 is a section showing the latches engaged with the T-piece which holds the weights up. Fig. 11 is an enlarged detail section of the ball-and-rod joints for adjusting the leaf of the outer desk.

In the above drawings, 1 represents a duplex desk embodying my invention, composed of two complete pieces of furniture adapted to telescope and form a single piece when desired. The "inner desk proper" 2, so called, serves as a standard for the outer desk 3 when the two are used in combination. Thus when the duplex desk is employed as a single piece of furniture the top of the outer desk serves as a writing or drawing surface, while the inner desk supplies the drawers. To enable the height of the desk to be changed, the outer desk is adapted to move vertically and is provided with mechanism to lock and firmly hold it at any desired height.

I will premise by saying that the inner desk is an ordinary office-desk, and one of the simplest ways to effect the above adjustment is to provide a series of holes in the ends of the inner desk, likewise a single hole or aperture in the lower part of the outer desk end, and by means of removable bolts enable the outer desk to be raised or lowered at pleasure. A second way, and one which I propose to use, is as follows: two vertical slots 4 are cut in the center panel at each end, and in these travel T-shaped blocks 5, the latter extending through the inner desk and engaging the lower bars 6 6 of the outer desk. Thus the latter, when in an upraised position, is held by said blocks. To counterbalance the desk, weights 7 7, connected by cords, are suspended interiorly of the desk proper. (See Fig. 6.) The outer desk at the front corners (see Figs. 8 and 9) is furnished with toothed bars or racks 8, co-operating with spring-bolts 9. The latter are actuated simultaneously by means of cords 10, which extend to the front and center of the desk proper, where they are attached to a ring 12, playing in a vertical slot 13 in the desk. By pulling on said ring and then turning it ninety degrees the bolts are held disengaged from the toothed bars, the ring now bearing transversely across its slot. The outer desk is then free to be raised or lowered, as desired. The corner-posts of said desk, fitting about the corners of the desk proper, hold the outer desk in position and permit of easy movement without sticking or becoming jammed. The outer desk is made with a solid top 14, to which is hinged or pivotally connected a folding cover 15, which, when the two desks are closed together, serves as the top of the duplex desk. Said cover 15 is adapted to be inclined in any position, and for this purpose I have secured at each end rods 16, (see Figs. 2 and 11,) pivotally connected to the cover, and which pass through guides 17, similarly mounted and furnished with holding-screws. Thus, if desired, the said cover may be placed upright and serve as an easel or support upon which to hang designs or other works from which copies are to be made, since this duplex desk is particularly adapted for studios and art-work. As in Fig. 4, the cover 15 may be thrown far back after separating the two desks, when it may be made to rest upon the edge of the desk proper and a large table is formed.

The above mechanism provides for vertical adjustment of the outer desk, permitting it to telescope upon the inner desk, and further provides for an adjustable top, which may be inclined at any angle. When the two desks are used as separate articles of furniture, the said cover may then be placed in a horizontal position and serve as a table.

To permit the two parts 2 3 to be movably connected, so that two distinct pieces of furniture—"desks," so called—can be produced, and since it is preferable to move the outer table horizontally when such act is to be accomplished, I have cut horizontal slots 18 in the lowermost horizontal end bars of the outer desk (see Fig. 7) and covered them by plates 19 in order to give the desk a more finished appearance. These slots are made to provide for the projecting piece on the T-blocks, which extends through and beyond the ends of the inner desk, and upon which the outer desk rests. Since the counterbalance-weights are connected with said blocks, it is evident that there is nothing to support the weights when the outer desk is separated from the inner desk. To hold the weights up, I have accordingly arranged the following mechanism, (see Fig. 10:) A lever 20 at the front lower part of the desk is connected by cords 21 to spring-actuated locking-bolts 23, secured upon the inner desk ends. Said bolts normally engage in the T-blocks, and when the outer desk is closed down upon the inner one said bolts spring into the T-blocks. Thus the two desks are interlocked and vertical adjustment cannot be made. By the engagement of these bolts with the T-blocks the weights are prevented from dropping when the outer desk is disengaged and pulled away from the inner desk. The outer desk being furnished with rollers, it is an easy matter to pull the desk forward, the projecting parts of the T-blocks passing through the slots as the outer desk is drawn forward. The desks are now separate and distinct, as shown in Fig. 3, and can be employed independently, if desired.

Figure 12:
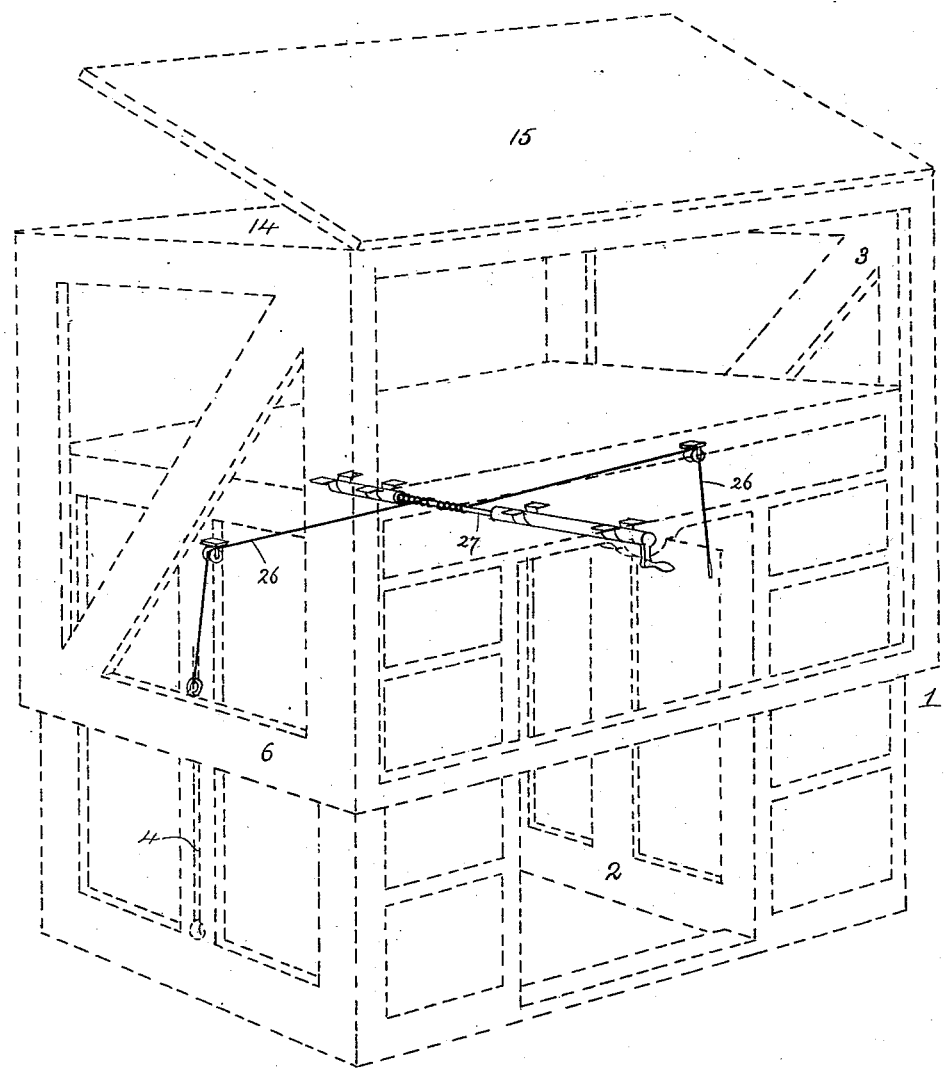
Figure 13:
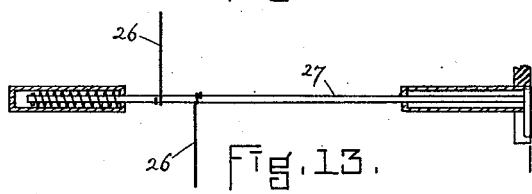

In Figs. 12 and 13 I have shown a horizontal section and perspective view of a modified form of mechanism by which the outer desk can be vertically adjusted and when so raised be held in place. To this end I have made use of the vertical slots in the ends of the inner desk and have dispensed with the T-blocks before described. Instead of said blocks I have substituted two cords 26, which are made fast to the lowermost bar of the outer desk and are located in the slots 4, passing up over rollers, and terminate upon a horizontal shaft 27, suitably journaled beneath the top of the desk proper and operated by a crank. By turning the latter the two cords extending to the opposite ends of the outer desk are coiled about or uncoiled from the shaft, and the outer desk is readily changed into any desired position vertically.

From the above description of my duplex desk it will be seen that when the two desks are used conjointly the top of the upper desk serves as the top for the duplex desk as a single article of furniture. When the two desks are used separately, the lower desk has its own top, while the outer desk is provided with a fixed top and a hinged cover, the latter serving as an easel or support or for an extension of the top of said desk. Thus a large surface is afforded for various purposes.

What I desire to claim is—

1. As a new article of manufacture, a duplex desk composed of an inner and an outer desk, the latter adapted to telescope upon the former and having horizontal as well as vertical motion, the said desks being separable in order that each may be capable of independent use, substantially as and for the purposes herein set forth.

2. As a new article of manufacture, a duplex desk consisting of two desks, the inner desk proper provided with a solid top and a series of drawers, and an outer desk also with a top and adapted to telescope the inner one, being vertically adjustable therewith, the two being employed jointly as a single article of furniture, but also being separable in order that they may be used independently, substantially as specified.

3. The improvement in furniture, consisting of two desks, an inner one provided with a top and drawers combined with an outer one, the latter adapted to telescope thereupon, and the outer desk being separable in order that they may constitute at will two independent desks, substantially as herein stated.

4. In a duplex desk, the combination, with the inner desk as an entirety, provided with vertical end slots and the T-blocks which travel therein and extend beyond, of an outer desk which rests upon said T-blocks, and the counter-weights connected with said blocks to permit the outer desk to telescope upon the inner in vertical paths, said desks being detachable from each other, substantially as described.

5. In a duplex desk in which two separable desks are adapted to telescope, the combination, with the inner desk slotted at the ends, the T-blocks in said slots, and the weights within said desk and suitably connected with said blocks, of the outer desk which engages with said blocks and the spring-actuated bolts which lock said blocks to permit of vertical adjustment, all substantially as and for the purposes specified.

6. In a duplex desk, the combination, with an inner desk provided with a top and drawers, the slotted ends, the T-blocks, and the counter-weights, of an outer telescoping desk separable therefrom in engagement with said blocks, the toothed rack interiorly upon the outer desk, and the similar locking-bolts secured to the inner desk and oppositely movable simultaneously, substantially as set forth and described.

7. A duplex desk composed of an inner stationary desk slotted at the ends and with T-blocks movable therein and projecting through said slots, combined with an outer telescoping desk in engagement with said blocks and the horizontal slot aligned with said blocks to permit separation of the two desks for independent use, substantially as herein stated and specified.

In testimony whereof I affix my signature in presence of two witnesses.

WILLIAM ORDWAY PARTRIDGE.

Witnesses:
H. E. LODGE,
FRANCIS C. STANWOOD.